US010868296B2

(12) United States Patent
Lee et al.

(10) Patent No.: US 10,868,296 B2
(45) Date of Patent: *Dec. 15, 2020

(54) METHOD FOR MANUFACTURING ELECTRODE INCLUDING POLYMER ELECTROLYTE AND ELECTRODE OBTAINED THEREBY

(71) Applicant: LG CHEM, LTD., Seoul (KR)

(72) Inventors: Jung-Pil Lee, Daejeon (KR); Eun-Bee Kim, Daejeon (KR); Ji-Young Kim, Daejeon (KR); Eun-Kyung Mok, Daejeon (KR); In-Sung Uhm, Daejeon (KR); Hye-Ri Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 16/309,768

(22) PCT Filed: Mar. 16, 2018

(86) PCT No.: PCT/KR2018/003118
§ 371 (c)(1),
(2) Date: Dec. 13, 2018

(87) PCT Pub. No.: WO2018/169361
PCT Pub. Date: Sep. 20, 2018

(65) Prior Publication Data
US 2019/0319258 A1 Oct. 17, 2019

(30) Foreign Application Priority Data
Mar. 16, 2017 (KR) .................. 10-2017-0033362

(51) Int. Cl.
*H01M 4/137* (2010.01)
*H01M 4/04* (2006.01)
(Continued)

(52) U.S. Cl.
CPC ......... *H01M 4/137* (2013.01); *H01M 4/0404* (2013.01); *H01M 4/0419* (2013.01);
(Continued)

(58) Field of Classification Search
CPC .. H01M 4/366; H01M 10/0565; H01M 4/139; H01M 4/0404; H01M 4/0407
See application file for complete search history.

(56) References Cited

U.S. PATENT DOCUMENTS 9,461,303 B2   10/2016  Iwasaki
9,685,655 B2    6/2017  Wang et al.
(Continued)

FOREIGN PATENT DOCUMENTS

EP   1 445 809 A2   8/2004
EP   3 467 907 A1   4/2019
(Continued)

OTHER PUBLICATIONS

International Search Report (PCT/ISA/210) issued in PCT/KR2018/003118, dated Jun. 28, 2018.
(Continued)

*Primary Examiner* — Stewart A Fraser
(74) *Attorney, Agent, or Firm* — Morgan, Lewis & Bockius LLP

(57) ABSTRACT

A method for manufacturing an electrode for a solid state battery and an electrode obtained thereby. In the electrode, the electrode active material particles are at least partially surface-coated with a first coating layer including a mixture of (a) a binder, a first polymer electrolyte or both a binder and a first polymer electrolyte, and (b) a conductive material. In addition, the first coating layer in the electrode is formed by an electrospraying and/or electrospinning process.

6 Claims, 2 Drawing Sheets

(51) Int. Cl.
  *H01M 4/139* (2010.01)
  *H01M 4/62* (2006.01)
  *H01M 10/0525* (2010.01)
  *H01M 10/0565* (2010.01)

(52) U.S. Cl.
  CPC .......... *H01M 4/139* (2013.01); *H01M 4/621* (2013.01); *H01M 10/0525* (2013.01); *H01M 10/0565* (2013.01)

(56) References Cited

U.S. PATENT DOCUMENTS

| | | |
|---|---|---|
| 2004/0146781 A1 | 7/2004 | Ohsawa et al. |
| 2005/0058907 A1 | 3/2005 | Kurihara et al. |
| 2005/0227150 A1 | 10/2005 | Xing et al. |
| 2011/0143018 A1 | 6/2011 | Peng et al. |
| 2011/0281175 A1 | 11/2011 | Hudson et al. |
| 2012/0110835 A1* | 5/2012 | Hudson ................. H01M 10/38 29/623.1 |
| 2012/0219841 A1 | 8/2012 | Bolandi et al. |
| 2013/0184385 A1 | 7/2013 | Ogihara |
| 2014/0377627 A1 | 12/2014 | Furuya et al. |
| 2016/0006018 A1 | 1/2016 | Wang et al. |
| 2019/0237757 A1* | 8/2019 | Lee .................... H01M 4/13 |

FOREIGN PATENT DOCUMENTS

| | | |
|---|---|---|
| JP | 11-7942 A | 1/1999 |
| JP | 2003-132877 A | 5/2003 |
| JP | 2003-217594 A | 7/2003 |
| JP | 2004-234879 A | 8/2004 |
| JP | 2005-051125 A | 2/2005 |
| JP | 2010-9773 A | 1/2010 |
| JP | 2016-189339 A | 11/2012 |
| JP | 2013-161529 A | 8/2013 |
| JP | 2014-506723 A | 3/2014 |
| JP | 2015-041543 A | 3/2015 |
| JP | 2019-525428 A | 9/2019 |
| KR | 10-2015-0126920 A | 11/2015 |
| KR | 10-2015-0132418 A | 11/2015 |
| WO | WO 2012/157046 A1 | 11/2012 |

OTHER PUBLICATIONS

Office Action issued in corresponding Japanese Patent Application No. 2019-508231 dated Feb. 3, 2020.

* cited by examiner

FIG. 1a – Related Art
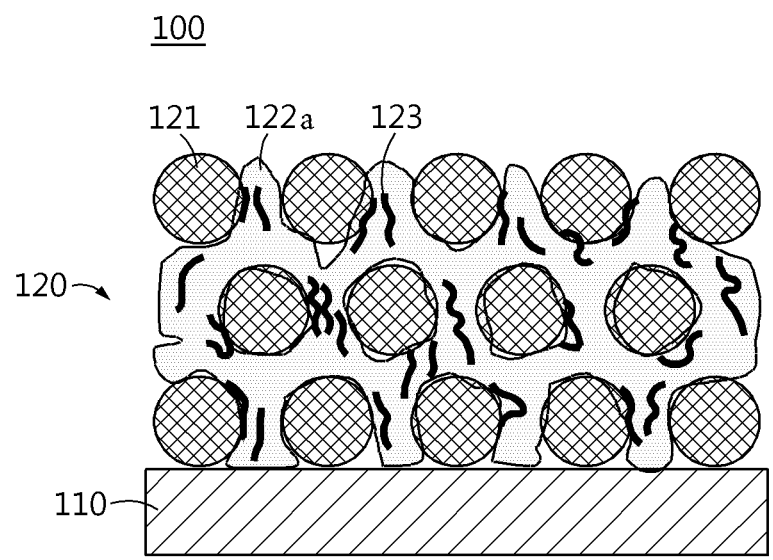
FIG. 1b – Related Art
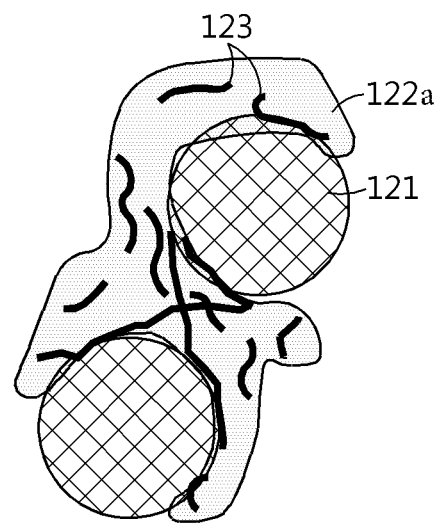

METHOD FOR MANUFACTURING ELECTRODE INCLUDING POLYMER ELECTROLYTE AND ELECTRODE OBTAINED THEREBY

TECHNICAL FIELD

The present application claims priority to Korean Patent Application No. 10-2017-0033362 filed on Mar. 16, 2017 in the Republic of Korea, the disclosures of which are incorporated herein by reference. The present disclosure relates to a method for manufacturing an electrode including a polymer electrolyte and an electrode obtained thereby. Particularly, the present disclosure relates to a method for manufacturing an electrode which has improved surface reactivity and transportability of the active material and a solid electrolyte in the electrode, and an electrode obtained thereby.

BACKGROUND ART

A lithium ion battery using a liquid electrolyte includes a negative electrode and a positive electrode divided by a separator, and thus may cause a short-circuit when the separator is damaged by deformation or external impact, which may lead to dangerous situations, such as overheating or explosion. Therefore, development of a polymer electrolyte capable of ensuring safety may be an important subject in the field of lithium ion secondary batteries.

A lithium secondary battery using a polymer electrolyte provides increased safety to a lithium ion battery, prevents leakage of an electrolyte to provide improved reliability of a battery and facilitates manufacture of a thin battery. In addition, such a lithium secondary battery may use lithium metal as a negative electrode to improve energy density, and thus is expected to be applied to a high-capacity secondary battery for electric vehicles as well as a compact secondary battery. Therefore, such a lithium secondary battery has been given many attentions as a next-generation battery.

However, a lithium secondary battery using a polymer electrolyte shows lower ion conductivity of a solid electrolyte as compared to a liquid electrolyte and provides low output characteristics particularly at low temperature. In addition, since a solid electrolyte shows lower adhesion to the surface of an active material as compared to a liquid electrolyte, and thus provides increased interfacial resistance. The solid electrolyte is distributed while not being in contact with an electrode active material so that the output characteristics or capacity characteristics may be degraded as compared to the amount of a conductive material introduced to a battery. FIG. 1a shows an electrode for a solid state battery including a solid polymer electrolyte according to the related art, and FIG. 1b is a schematic view illustrating partially enlarged FIG. 1a. Referring to FIG. 1a and FIG. 1b, the conductive material is contained in the solid electrolyte but a part of the solid electrolyte introduced to the battery cannot be in direct contact with the active material but is spaced apart from the active material since it has no fluidity. The remaining conductive material cannot participate directly in the electrochemical reaction upon the driving of the battery to cause degradation of output characteristics or capacity. For this reason, when using such a solid electrolyte, it is not possible to realize the capacity of the electrode sufficiently, unlike the electrode using a liquid electrolyte. As a result, the electrode using such a solid electrolyte provides a capacity lower than the designed or theoretical capacity.

DISCLOSURE

Technical Problem

The present disclosure is designed to solve the problems of the related art, and therefore the present disclosure is directed to providing an electrode which shows an increased reactive site between an electrode active material and a polymer electrolyte, has improved lithium ion conductivity and electron conductivity to provide improved capacity and output characteristics of an electrode, and provides improved energy density. The present disclosure is also directed to providing a method for manufacturing the electrode having the above-mentioned technical characteristics.

Technical Solution

The present disclosure provides an electrode for a solid state battery to solve the above-mentioned technical problems.

According to a first embodiment of the present disclosure, there is provided an electrode for a solid state battery which includes a plurality of electrode active material particles, a binder resin, a first polymer electrolyte or a combination thereof, a second polymer electrolyte and a conductive material, wherein the electrode active material particles are at least partially surface-coated with a first coating layer including (a) a mixture of the binder resin, the first polymer electrolyte or the combination thereof, and (b) the conductive material, the second polymer electrolyte at least partially covers the surface of the first coating layer, the surface of the electrode active material particles or both the surface of the first coating layer and the surface of the electrode active material particles, and the electrode active material particles are bound to each other by at least one of the binder resin, the first polymer electrolyte and the second polymer electrolyte to form an integrated structure.

According to a second embodiment, there is provided the electrode of the first embodiment, wherein the first polymer electrolyte is present, and wherein the first polymer electrolyte and the second electrolyte are the same or different.

According to a third embodiment, there is provided the electrode of the first embodiment or the second embodiment, wherein the first polymer electrolyte is present, and wherein the first polymer electrolyte is different from the second polymer electrolyte.

According to a fourth embodiment, there is provided a method for manufacturing the electrode having the above-mentioned characteristics, the method including the steps of: (S10) preparing a slurry for forming an electrode including (a) a binder resin, a first polymer electrolyte, or a combination thereof, (b) a conductive material and (c) a plurality of electrode active material particles; (S20) coating a surface of a current collector with the slurry; and (S30) impregnating a product of (S20) with a second polymer electrolyte.

According to a fifth embodiment, there is provided the method of the fourth embodiment, wherein the slurry includes the first polymer electrolyte and a product of (S20) includes the electrode active material particles at least partially surface-coated with the first polymer electrolyte.

According to a sixth embodiment, there is provided the method of the fourth or the fifth embodiment, wherein the slurry includes the first polymer electrolyte, and wherein the method further includes step (S40) of drying a product obtained from (S30), wherein a product of (S40) is an electrode in which the electrode active material particles are bound to each other by at least one of the first polymer electrolyte and the second polymer electrolyte to form an integrated structure.

Meanwhile, according to a seventh embodiment, there is provided the method of the fourth to the sixth embodiments, wherein step (S20) is carried out by an electrospraying process.

Advantageous Effects

The electrode according to the present disclosure includes a conductive material disposed on the surface portion of the electrode active material so that it does not remain in the non-reactive region. Thus, even when using a small amount of conductive material, it is possible to provide excellent charge/discharge characteristics and to reduce the amount of the conductive material. In addition, since the conductive material is disposed effectively, it is possible to improve the electroconductivity, and to avoid a need for carrying out pressing under a severe condition in order to reduce the porosity of the electrode and to increase the contact area between the electrode and the polymer electrolyte during the pressing. Therefore, it is possible to solve the problem of breakage and damage of the electrode active material occurring under high pressure. In addition, the electrode according to the present disclosure has improved electroconductivity and provides improved output characteristics when it is applied to a battery. Finally, the electrode according to the present disclosure ensures the channel of a solid electrolyte and increases lithium ion transportability during charging/discharging to improve the capacity development ratio of the electrode, and thus improves the capacity and energy density of the electrode.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or ratios of the elements in the accompanying drawing may be exaggerated for the purpose of more clear description.

FIG. 1a and FIG. 1b are schematic views illustrating the distribution of a conductive material in the electrode including a polymer electrolyte according to the related art.

FIG. 2b is a partially enlarged view illustrating the electrode active material layer as shown in FIG. 2a.

BEST MODE

Figure 2A:
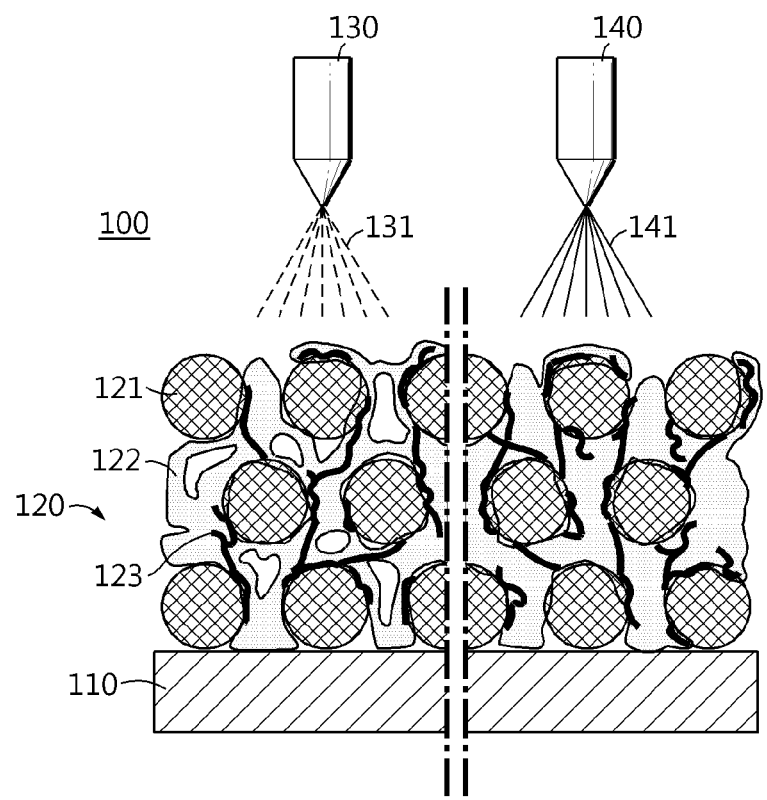
FIG. 2a is a schematic view illustrating the method for manufacturing an electrode according to the present disclosure and the structure of the electrode obtained thereby.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

In the following specification, specific terms are used for convenience and are not limiting. Such terms as 'right', 'left' 'top surface' and 'bottom surface' refer to the directions as shown in the drawings to which reference is made. Such terms as 'internally' and 'externally' refer to the directions toward or away from the geometrical centers of the designated devices, systems and members thereof. The terms 'front', 'rear', 'up', 'down' and related words and phrases refer to the locations and bearings in the drawing to which reference is made and are not limiting. The same is also applied to the above-listed words, derivatives thereof and synonyms thereof.

The present disclosure relates to a method for manufacturing an electrode for a lithium ion secondary battery and an electrode obtained thereby. As used herein, the lithium ion secondary battery is a solid state battery using a polymer electrolyte as an electrolyte. Herein, the solid state battery may also be referred to as a lithium polymer secondary battery or lithium ion polymer secondary battery.

According to the present disclosure, the electrode includes an electrode active material layer including a plurality of electrode active material particles, a first polymer electrolyte, a second polymer electrolyte and a conductive material. The electrode active material layer may be formed on at least one surface of a current collector. In addition, the electrode may further include a binder resin if desired. The electrode may further include various additives to supplement or improve the physicochemical properties thereof, if desired. The additives are not particularly limited but may include at least one additive such as an oxidation stabilizer additive, reduction stabilizer additive, flame retardant, heat stabilizer and an anti-fogging agent.

Figure 2B:
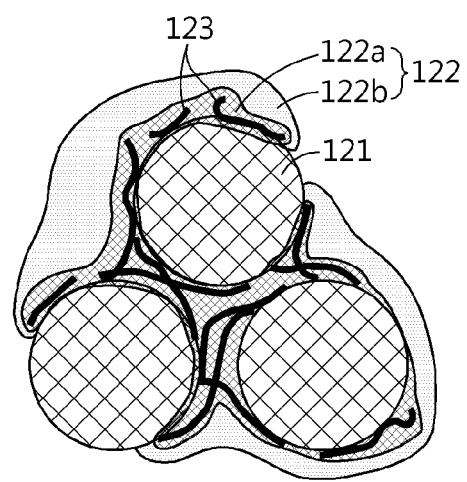

According to an embodiment of the present disclosure, the electrode active material particles are at least partially surface-coated with a first coating layer including a mixture of a first polymer electrolyte and a conductive material. Meanwhile, according to an embodiment of the present disclosure, the first coating layer may further include at least one of the above-mentioned additives. In addition, the second polymer electrolyte at least partially covers the surface of the first coating layer, the surface of the particles or both surfaces. In other words, the second polymer electrolyte forms a second coating layer. In the electrode according to the present disclosure, the electrode active material particles are bound to each other by at least one of the first polymer electrolyte and the second polymer electrolyte to form an integrated structure. FIG. 2b is a partially enlarged view illustrating the electrode according to the present disclosure, wherein the first coating layer is formed on the surface of the electrode active material particles, and the second coating layer is formed on the surface of the electrode active material particles coated with the first coating layer. In addition, the conductive material is contained in the first coating layer so that it may be distributed very closely to the periphery of the active material. Therefore, the distance between the conductive material and the electrode active material is minimized and the contact frequency between them is increased.

In addition, according to the present disclosure, the electrode may include a current collector. For example, the integrated electrode structure (electrode active material layer) may be formed on one surface of the current collector. In other words, the electrode according to the present disclosure has an electrode layer including the first polymer electrolyte, the second polymer electrolyte and the conductive material and formed on at least one surface of the current collector, wherein the electrode layer has the electrode structure as described above. Additionally, as described above, the electrode layer may further include a binder resin and additives, if desired.

According to the present disclosure, the electrode may be any one of a negative electrode and a positive electrode. When the electrode is a negative electrode (anode), it may include any electrode active material that can be used as a negative electrode active material for a lithium ion secondary battery. For example, the negative electrode active material may include any one selected from: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me':Al, B, P, Si, elements of Group 1, 2 or 3 in the Periodic Table, halogen; $0 \leq x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like, or a combination of two or more of them. According to a particular embodiment, the negative electrode active material may include a carbonaceous material and/or Si.

When the electrode is a positive electrode (cathode), it may include any electrode active material that can be used as a positive electrode active material for a lithium ion secondary battery. For example, the positive electrode active material may include, but is not limited to: a layered compound such as lithium cobalt oxide ($LiCoO_2$) or lithium nickel oxide ($LiNiO_2$), or a compound substituted with one or more transition metals; lithium manganese oxide such as $Li_{1+x}Mn_{2-x}O_4$ (wherein x is 0-0.33), $LiMnO_3$, $LiMn_2O_3$ or $LiMnO_2$, or the like; lithium copper oxide ($Li_2CuO_2$); vanadium oxide, such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); spinel-type lithium manganese composite oxide $LiNi_xMn_{2-x}O_4$; $LiMn_2O_4$ in which a part of Li is substituted with alkaline earth metal ions; disulfide compound; $Fe_2(MoO_4)_3$, or the like.

According to the present disclosure, the current collector shows electroconductivity and may include a metal plate, and an adequate current collector may be used depending on the polarity of the collector electrode known to the field of secondary batteries.

According to the present disclosure, the conductive material is added in an amount of 1-30 wt % based on the total weight of the mixture including the electrode active material. The conductive material is not particularly limited, as long as it has conductivity while not causing any side reaction with the other elements of the battery. Particular examples of the conductive material include any one selected from: graphite, such as natural graphite or artificial graphite; carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; metal oxides, such as titanium oxide; conductive materials, such as polyphenylene derivatives; or the like, or a combination of two or more of them.

According to the present disclosure, the binder resin is an ingredient which assists the binding of an active material with a conductive material, or the like, and the binding to a collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like. In general, the binder resin is added in an amount of 1-30 wt % or 1-10 wt %, based on the total weight of the mixture including the electrode layer.

According to the present disclosure, the first coating layer includes a mixture of the first polymer electrolyte and the conductive material and at least partially covers the surface of the electrode active material particles.

In other words, the particles in the electrode layer are integrated in such a manner that they are bound to each other in a point-point and/or surface-surface manner mostly by means of the second polymer electrolyte to form an integrated electrode. In addition, the particles are preliminarily coated with the first coating layer partially or totally on the surface thereof. Thus, since the particles are coated with the first coating layer and the conductive material contained in the electrode are disposed and concentrated around the surface of the electrode active material, it is possible to increase the reactive site between the active material and the solid electrolyte. In addition, it is possible to reduce the amount of the conductive material.

According to the present disclosure, the first polymer electrolyte and the second polymer electrolyte may be the same or different. The first polymer electrolyte covers the surface of the particles primarily and preferably has a broad potential window. For example, in the case of a positive electrode, the first polymer electrolyte is a polymer electrolyte having excellent oxidation stability preferably. In addition, in the case of a negative electrode, it is preferred to use a polymer electrolyte having excellent reduction stability as the first polymer electrolyte. According to an embodiment of the present disclosure, the second polymer electrolyte may be the same as or different from the above-mentioned first polymer electrolyte. Since the second polymer electrolyte mainly functions to transport lithium ions in an electrode, it may be any material having high ion conductivity, for example an ion conductivity of $10^{-4}$ s/m or more, and is not particularly limited. According to an embodiment of the present disclosure, the first polymer electrolyte may be suitably different from the second polymer electrolyte in order to supplement the characteristics of the electrode and to realize the characteristics of the electrode active material particles.

According to the present disclosure, each of the first polymer electrolyte and the second polymer electrolyte may be a solid polymer electrolyte formed by adding a polymer resin to a solvated lithium salt, or a polymer gel electrolyte including a polymer resin impregnated with an organic electrolyte containing an organic solvent and a lithium salt.

According to an embodiment of the present disclosure, the solid polymer electrolyte is not particularly limited, and any polymer material may be used as long as it has ion conductivity and includes a polymer material used generally as a solid electrolyte material for a solid state battery. Particular examples of the solid polymer electrolyte may include a polyether polymer, polycarbonate polymer, acrylate polymer, polysiloxane polymer, phosphazene polymer, polyethylene derivative, alkylene oxide derivative, phosphate polymer, polyagitation lysine, polyester sulfide, polyvinyl alcohol, polyvinylidene fluoride, polymer containing an ionically dissociatable group, or the like. According to an embodiment of the present disclosure, the solid polymer electrolyte may include a polymer resin, such as a branched copolymer including polyethylene oxide (PEO) backbone copolymerized with a comonomer including an amorphous polymer, such as PMMA, polycarbonate, polydiloxane (pdms) and/or phosphazene, comb-like polymer, crosslinked polymer resin, or the like.

According to an embodiment of the present disclosure, the polymer gel electrolyte includes a lithium salt-containing organic electrolyte and a polymer resin, wherein the organic electrolyte is used in an amount of 60-400 parts by weight based on the weight of the polymer resin. There is no particular limitation in the polymer used for the gel electrolyte, and particular examples of the polymer include PVC polymers, PMMA polymers, polyacrylonitrile (PAN), polyvinylidene fluoride (PVdF), polyvinylidene fluoride-co-hexafluoropropylene (PVdF-HFP), or the like.

In the electrolyte according to the present disclosure, the lithium salt is an ionizable lithium salt and may be represented by $Li^+X^-$. There is no particular limitation in the anion of the lithium salt and particular examples thereof include: $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Meanwhile, according to an embodiment of the present disclosure, the second polymer electrolyte may be a polymer gel electrolyte. The polymer gel electrolyte has excellent ion conductivity ($10^{-4}$ s/m or more) and shows bindability, thereby providing a function not only as an electrolyte but also as an electrode binder resin which imparts binding force among the electrode active material particles and between the electrode layer and the current collector.

According to an embodiment of the present disclosure, the first coating layer may include at least one of the binder resin and the first solid polymer electrolyte. In other words, the binder resin may be used instead of the first solid electrolyte or together with the first polymer electrolyte, as necessary.

Hereinafter, the method for manufacturing the above-described electrode will be explained. The method described hereinafter is one of the methods applicable to manufacture of the electrode according to the present disclosure.

According to an embodiment of the present disclosure, application of the first mixture may be carried out by using an electrospraying and/or electrospinning process. Electrospraying is a kind of surface coating process characterized by spraying a coating solution in the form of fine liquid droplets by the voltage applied to the spray nozzle so that the coating solution may be coated in the form of particles. Electrospinning is similar to electrospraying but is characterized in that the coating solution is coated in a 1-D structure not in the form of particles. Reference can be made by the electrospraying device and method disclosed in Korean Patent Publication No. 0271116 about electrospraying. According to an embodiment of the present disclosure, the first mixture may be applied by a known slurry coating process, such as dip coating, gravure coating, slot die coating, or the like.

First, a first mixture containing a first polymer electrolyte and a conductive material is prepared. The first polymer electrolyte may be prepared in the form of a melt blend formed by melting a polymer resin and a lithium salt at high temperature, or in the form of a solution containing a polymer resin and a lithium salt dispersed homogeneously in an organic solvent. Then, the conductive material is added to the blend or dispersion and mixed therewith to prepare the first mixture. If desired, the first mixture may include the binder resin instead of the first polymer electrolyte or together with the first polymer resin.

Next, an electrolyte active material is mixed with the first mixture to prepare a slurry for forming an electrode. Herein, the slurry includes the polymer electrolyte in an amount of 1-100 parts by weight, 2-50 parts by weight, 2-20 parts by weight, or 2-10 parts by weight, based on 100 parts by weight of the electrode active material.

However, the method for preparing the slurry is for illustrative purposes only and the scope of the present disclosure is not limited thereto. Particularly, the order of introducing or mixing the ingredients of the slurry may be modified considering the physicochemical properties of the ingredients and the characteristics of the electrode or battery to be obtained. For example, the polymer electrolyte, conductive material and the electrode active material may be introduced to a dispersion medium, such as a solvent, at different times or at the same time.

Then, the slurry is applied to at least one surface of a current collector, followed by drying. In this step, the electrode active material particles are at least partially surface-coated with the first coating layer containing the binder resin and/or the first polymer electrolyte. Since the first coating layer is formed on the surface of the particles, the whole of the conductive material introduced to the electrode is disposed in such a manner that it may be in contact with the electrode active material particles sufficiently. As described above, the application may be carried out by using a conventional electrode coating process, such as slot die coating. Meanwhile, according to an embodiment of the present disclosure, the application may be carried out by using an electrospraying and/or electrospinning process. FIG. 2a is a schematic view illustrating a method for applying the slurry to the surface of a current collector through electrospraying. Referring to FIG. 2a, electrospraying is carried out while a slurry containing an electrode active material and a polymer electrolyte is supplied from a slurry feed tank continuously into an electrospraying nozzle, to which high voltage is applied, through a metering pump. Herein, in order to reduce the surface tension and to induce volatility, a solvent is preferably added to the slurry so that the slurry may be prepared in the form of an adequate spraying solution. The solvent is not particularly limited but particular examples of the solvent include at least one selected from water and organic solvents, such as, dimethyl formamide (DMF), N-methyl-2-pyrrolidone (NMP), acetone, dimethyl sulfoxide (DMSO), tetrahydrofuran (THF), acetonitrile, ethanol and hexane. The spraying solution has a solid content of 1-50%, 5-30%, or 10-20%. The solid content refers to ingredients in the form of solid and means any solid phase ingredient of the spraying solution, such as an electrode active material, binder, conductive material or solid electrolyte, except a liquid phase, such as a solvent.

In addition, the spraying solution is subjected to electrospraying by ejecting it in a predetermined amount after calculating an adequate electric capacity of the active material, considering the viscosity and surface tension of the spraying solution, voltage applied thereto, or the like. Herein, the voltage may be controlled adequately within a range of 1 kV to 50 kV. The voltage may be controlled to 40 kV or less, 30 kV or less, 20 kV or less, 10 kV or less, or 5 kV or less, within the above-defined range. Meanwhile, the distance between the spinning nozzle and the current collector is not particularly limited but may be controlled to an adequate distance depending on processing conditions. It is possible to obtain an electrode including the electrode active material and solid electrolyte dispersed homogeneously therein through the electrospraying. In addition, it is possible to disperse the conductive material homogeneously on the surface of the electrode active material without localization at a specific portion in the electrode.

In this step, the electrode active material particles are at least partially surface-coated with the first coating layer containing the first polymer electrolyte. Since the first coating layer is formed on the surface of the particles, the whole of the conductive material introduced to the electrode is disposed so that it may be in contact with the electrode active material particles sufficiently.

Meanwhile, according to an embodiment of the present disclosure, it is possible to further carry out a step of drying the product of the electrospraying process after the electrospraying process. The drying may be carried out under vacuum and the temperature is preferably controlled at a temperature between about 80° C. and 150° C.

In addition, if desired, it is possible to carry out a pressurization step after the drying step. The pressurization step performs packing of the ingredients of the electrode so that the electrode may have an adequate level of porosity, and is not limited to a particular method. For example, any known pressurization methods, such as hot pressing or rolling, may be selected adequately. If desired, the pressurization may be controlled under a suitable temperature condition through heating or cooling.

After that, the dried product of the particles coated with the first coating layer is impregnated with a second polymer electrolyte.

In this step, the second polymer electrolyte may be prepared in a liquid phase, like the first polymer electrolyte. In other words, the second polymer electrolyte may be provided in the form of a melt blend by melting a polymer resin and a lithium salt at high temperature, or in the form of a liquid polymer electrolyte which is a dispersion containing a polymer resin and a lithium salt homogeneously in an organic solvent. The dried product is impregnated with the liquid polymer electrolyte so that it may be packed with the polymer electrolyte. The liquid polymer electrolyte infiltrates into the pores of the dried product so that the vacant spaces (voids) of the electrode may be filled with the polymer electrolyte.

Meanwhile, according to an embodiment of the present disclosure, the above-mentioned impregnation step may be carried out by dip coating the dried product with the liquid polymer electrolyte, or by supplying the liquid polymer electrolyte to the dried product through a spray-type nozzle in combination with or independently from the dip coating process.

In addition, according to an embodiment of the present disclosure, the electrospraying step and the impregnation step may be carried out continuously. Herein, it is preferred that an adequate drying device is provided before carrying out the impregnation step and after carrying out the spraying step so that the impregnation step may be performed after the first slurry is solidified. However, since drying is partially performed during the coating through the electrospraying and electrospinning processes, a complete drying step is not necessarily required.

During this step, the voids between the electrode active material particles are filled with the polymer electrolyte, and thus the resistance of the electrode active material and the polymer electrolyte is reduced, the area of the electrochemically reactive site is increased and lithium ion conductivity is improved, resulting in improvement of the performance of a battery.

Then, the impregnated electrode is dried. After drying, a pressing step may be further carried out as necessary. The pressing step may be carried out adequately through at least one process selected from hot pressing, cold pressing, uniaxial pressing and isostatic pressing.

According to an embodiment of the present disclosure, the finished electrode has a porosity of 0-30%, 1-20% or 5-10%.

In the electrode obtained by the method, the active material is coated with the first coating layer and the coated active material particles are bound to each other in a point-point or surface-surface manner by the first polymer electrolyte and/or the second polymer electrolyte to form an integrated electrode structure. In other words, the electrode active material is coated twice with the polymer electrolytes, and the conductive material is incorporated to the first coating layer upon the first coating to increase the availability of the conductive material.

FIG. 1a and FIG. 1b are schematic views illustrating the electrode obtained by the conventional method. According to the related art, an active material, a solid electrolyte and a conductive material are mixed at once to obtain an electrode slurry, which, in turn, is coated onto a current collector to provide an electrode.

In this case, the conductive material is also disposed in a non-reactive region where no electrochemical reaction occurs, and thus a significant amount of the conductive material introduced to the electrode cannot participate in the reaction. For this, there is a disadvantage in that the availability of the conductive material is low. In addition, due to such distribution of the conductive material, the amount of the solid electrolyte is decreased to cause a decrease in ion conductivity undesirably. To solve the problem, it is required to carry out a pressing process including pressing the electrode surface under the condition of high pressure after coating the electrode so that the contact area between the electrode active material and the solid electrolyte may be increased. However, there is a problem in that the active material is broken due to the high pressure applied during the pressing process to cause degradation of the capacity or life characteristics of a battery.

FIG. 2a and FIG. 2b are schematic view illustrating the electrode according to the present disclosure. Referring to FIG. 2a and FIG. 2b, the conductive material is disposed closely to the surface of the electrode active material and participates in the electrochemical reaction at a high ratio. Thus, it is possible to reduce the amount of the conductive material. In addition, even when no severe pressure is applied during the pressing, reactive sites can be ensured sufficiently to prevent deterioration of the electrode. In addition, it is possible to increase lithium ion transportability and to increase the capacity development ratio of the active material.

In another aspect, the present disclosure provides a lithium ion secondary battery including at least one electrode as described above. The battery is provided with a positive electrode, a negative electrode and a polymer electrolyte membrane interposed between the positive electrode and the negative electrode. The negative electrode and/or the positive electrode may be the above-described electrode and may include a polymer electrolyte.

According to the present disclosure, the polymer electrolyte membrane is interposed between the negative electrode and the positive electrode and functions not only to electrically insulate the negative electrode from the positive electrode but also to conduct lithium ions therethrough. Any polymer electrolyte membrane used conventionally in the field of solid state batteries may be used with no particular limitation. According to an embodiment of the present disclosure, the polymer electrolyte membrane is provided in the form of a film or membrane and may include at least one of the first polymer electrolyte and the second polymer electrolyte.

In still another aspect, the present disclosure provides a battery module including the secondary battery as a unit cell, a battery pack including the battery module, and a device including the battery pack as an electric power source.

Herein, particular examples of the device may include but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be explained in more detail. The following examples are for illustrative purposes only and the scope of the present disclosure is not limited thereto.

Examples: Manufacture of Electrode and Battery

Example 1

(1) Manufacture of Electrode

To form a slurry, NCM811 ($LiNi_{0.8}Co_{0.1}Mn_{0.1}O_2$) as an electrode active material, VGCF as a conductive material and a first polymer solid electrolyte (PEO+LiFSI, molar ratio 20:1) were mixed at a weight ratio of 90:5:5. The resultant mixture was introduced to and agitated with acetonitrile to form an electrode slurry. An aluminum current collector having a thickness of 20 μm was prepared. Then, the slurry was applied to the current collector through electrospraying (1.5 kV, distance between the spinning nozzle and the current collector: 20 cm) and the resultant product was vacuum dried at 120° C. for 4 hours. Then, a pressing process was carried out to obtain an electrode having an electrode loading of 2 mAh/cm², an electrode layer thickness of 48 μm and a porosity of 22%. In this manner, a structure including the active material surface-coated with the conductive material and the solid electrolyte was formed. Meanwhile, to improve the ion conductivity in the electrode, a second polymer solid electrolyte (PEO+LiFSI, molar ratio 20:1) solution was prepared, and then the electrode obtained as described above was impregnated with the solution and vacuum dried at 120° C. for 4 hours. After the impregnation, a finished electrode having a porosity of 10% was obtained.

(2) Manufacture of Battery

An electrode cut into a circular shape of 1.4875 cm² and lithium metal foil cut into a circular shape of 1.7671 cm² as a counter electrode were used to obtain a coin-type half-cell. Particularly, a 50 μm solid electrolyte membrane (PEO+LiFSI, molar ratio 20:1) was interposed between the electrode and lithium metal to form an electrode assembly, which, in turn, was fabricated into a coin cell.

Example 2

An electrode and a battery were manufactured in the same manner as Example 1, except that NCM811 ($LiNi_{0.8}Co_{0.1}Mn_{0.1}O_2$) as an electrode active material, VGCF and a first polymer solid electrolyte (PEO+LiFSI, molar ratio 20:1) were mixed at a weight ratio of 90:3:7.

Example 3

An electrode and a battery were manufactured in the same manner as Example 1, except that NCM811 ($LiNi_{0.8}Co_{0.1}Mn_{0.1}O_2$) as an electrode active material, VGCF and a first polymer solid electrolyte (polypropylene carbonate (PPC)+LiFSI, molar ratio 20:1) were mixed at a weight ratio of 90:3:7.

Comparative Example 1

(1) Manufacture of Electrode

To form a slurry, NCM811 ($LiNi_{0.8}Co_{0.1}Mn_{0.1}O_2$) as an electrode active material, VGCF as a conductive material and a polymer solid electrolyte (PEO+LiFSI, molar ratio 20:1) were mixed at a weight ratio of 82:2.8:15.2. The resultant mixture was introduced to and agitated with acetonitrile to form an electrode slurry. A copper current collector having a thickness of 20 μm was prepared, and then the slurry was applied to the current collector and vacuum dried at 120° C. for 4 hours. Then, a pressing process was carried out to obtain an electrode having an electrode loading of 2 mAh/cm², an electrode layer thickness of 48 μm and a porosity of 10%.

(2) Manufacture of Battery

An electrode cut into a circular shape of 1.4875 cm² and lithium metal foil cut into a circular shape of 1.7671 cm² as a counter electrode were used to obtain a coin-type half-cell. Particularly, a 50 μm solid electrolyte membrane (PEO+LiFSI, molar ratio 20:1) was interposed between the electrode and lithium metal to form an electrode assembly, which, in turn, was fabricated into a coin cell.

Comparative Example 2

An electrode and a battery were manufactured in the same manner as Comparative Example 1, except that NCM811 as an electrode active material, VGCF as a conductive material and a polymer solid electrolyte (PEO+LiFSI, molar ratio 20:1) were mixed at a weight ratio of 82:5.5:12.5.

Comparative Example 3

An electrode and a battery were manufactured in the same manner as Comparative Example 1, except that NCM811 as an electrode active material, VGCF as a conductive material and a polymer solid electrolyte (PEO/PPC (1:1)+LiFSI, molar ratio 20:1) were mixed at a weight ratio of 82:5.5:12.5.

Comparative Example 4

(1) Manufacture of Electrode

To form a slurry, NCM811 ($LiNi_{0.8}Co_{0.1}Mn_{0.1}O_2$) as an electrode active material, VGCF as a conductive material and a first polymer solid electrolyte (PEO+LiFSI, molar ratio 20:1) were mixed at a weight ratio of 90:3:7. The resultant mixture was introduced to and agitated with acetonitrile to form an electrode slurry. A copper current collector having a thickness of 20 μm was prepared, and then the slurry was applied to the current collector and vacuum dried at 120° C. for 4 hours. Then, a pressing process was carried out to obtain an electrode having an electrode loading of 2 mAh/$cm^2$, an electrode layer thickness of 48 μm and a porosity of 25%. In this manner, a structure including the active material surface-coated with the conductive material and the solid electrolyte was formed. Meanwhile, to improve the ion conductivity in the electrode, a second polymer solid electrolyte (PEO+LiFSI, molar ratio 20:1) solution was prepared, and then the electrode obtained as described above was impregnated with the solution and vacuum dried at 120° C. for 4 hours. After the impregnation, a finished electrode having a porosity of 10% was obtained.

(2) Manufacture of Battery

An electrode cut into a circular shape of 1.4875 $cm^2$ and lithium metal foil cut into a circular shape of 1.7671 $cm^2$ as a counter electrode were used to obtain a coin-type half-cell. Particularly, a 50 μm solid electrolyte membrane (PEO+LiFSI, molar ratio 20:1) was interposed between the electrode and lithium metal to form an electrode assembly, which, in turn, was fabricated into a coin cell.

Test Example 1: Evaluation of Electric Resistance of Active Material Layer in Electrode Each of the electrodes according to Examples 1-3 and Comparative Examples 1-4 was determined for electric resistance by using an MP tester. The results are shown in the following Tables 1 and 2.

Test Example 2: Evaluation of Initial Discharge Capacity and Life Characteristics Each of the batteries according to Examples 1-3 and Comparative Examples 1-4 was subjected to charging/discharging and the initial discharge capacity and capacity maintenance were evaluated. Meanwhile, to carry out evaluation of life characteristics, charging/discharging was carried out at 60° C. under 0.05 C, the $30^{th}$ cycle was terminated in a discharged state, and the capacity maintenance was evaluated.

Charging condition: Constant Current (CC)/Constant Voltage (CV) (4.0V or 4.25 V, 0.005 C current cut-off)

Discharging condition: Constant Current (CC) condition 3V

The capacity maintenance was derived by calculating the ratio of the discharge capacity after the $30^{th}$ cycle based on the first discharge capacity. The results are shown in the following Tables 1 and 2.

Test Example 3: Evaluation of Output Characteristics

Each of the batteries according to Examples 1-3 and Comparative Examples 1-4 was evaluated for output characteristics. The capacity at 0.2 C was compared with the capacity at 0.05 C and 4.0V. The results are shown in the following Tables 1 and 2.

TABLE 1

| Example | Electric resistance of active material layer (ohm*cm) | Discharge capacity (mAh/g, 4.0 V) | Discharge capacity maintenance (%, 30 cycle, 4.0 V) | Discharge capacity (mAh/g, 4.25 V) | Discharge capacity maintenance (%, 30 cycle, 4.25 V) | Output characteristics (%, 0.2 C/0.05 C, 4.0 V) |
|---|---|---|---|---|---|---|
| 1 | 10.8 | 138 | 94 | | | 76 |
| 2 | 12.1 | 135 | 95 | 170 | 86 | 73 |
| 3 | 12.3 | 136 | 95 | 178 | 94 | 72 |

TABLE 2

| Comp. Ex. | Electric resistance of active material layer (ohm*cm) | Discharge capacity (mAh/g, 4.0 V) | Discharge capacity maintenance (%, 30 cycle, 4.0 V) | Discharge capacity (mAh/g, 4.25 V) | Discharge capacity maintenance (%, 30 cycle, 4.25 V) | Output characteristics (%, 0.2 C/0.05 C, 4.0 V) |
|---|---|---|---|---|---|---|
| 1 | 34.4 | 126 | 89 | | | |
| 2 | 20.8 | 129 | 91 | | | |
| 3 | 21.1 | 130 | 91 | 173 | 89 | 65 |
| 4 | 14.2 | 140 | 94 | 173 | 88 | 73 |

As can be seen from the foregoing, according to the present disclosure, it is possible to improve the structure of an electrode for a solid state battery and to effectively reduce the amount of a conductive material. Therefore, it is possible to increase the amount of a solid electrolyte to provide an increased capacity development ratio derived from improved ion conductivity. In addition, such improved electroconductivity in the electrode allows improvement of output characteristics. Further, since a PPC solid electrolyte stable against high voltage is coated on the surface of an active material, it is possible to increase the capacity of a positive electrode as determined from the positive electrode upper limit voltage of 4.25V increased from 4.0V in the case of PEO. It is also possible to improve the oxidation stability.

DESCRIPTION OF DRAWING NUMERALS

100: Electrode
110: Current collector
120: Electrode active material layer
121: Electrode active material particles
122: First and second coating layers
122a: First coating layer 122b: Second coating layer
123: Conductive material
130: Electrospraying
131: Slurry for forming electrode
140: Spray type nozzle
141: Liquid polymer electrolyte

What is claimed is:

1. An electrode for a solid state battery which comprises
a plurality of electrode active material particles;
a binder resin, a first polymer electrolyte or a combination thereof;
a second polymer electrolyte; and
a conductive material,
wherein
the electrode active material particles are at least partially surface-coated with a first coating layer comprising a mixture of (a) the binder resin or the first polymer electrolyte or the combination thereof, and (b) the conductive material,
the second polymer electrolyte at least partially covers the surface of the first coating layer, the surface of the electrode active material particles or both the surface of the first coating layer and the surface of the electrode active material particles, and
the electrode active material particles are bound to each other by at least one of the binder resin, the first polymer electrolyte and the second polymer electrolyte to form an integrated structure.

2. The electrode for a solid state battery according to claim 1, wherein the first polymer electrolyte is present, and wherein the first polymer electrolyte and the second electrolyte are the same or different.

3. The electrode for a solid state battery according to claim 1, wherein the first polymer electrolyte is present, and wherein the first polymer electrolyte is different from the second polymer electrolyte.

4. A method for manufacturing an electrode for a solid state battery, comprising the steps of:
(S10) preparing a slurry for forming an electrode comprising (a) a binder resin, a first polymer electrolyte, or a combination thereof, (b) a conductive material and (c) a plurality of electrode active material particles, wherein the slurry includes the first polymer electrolyte;
(S20) coating a surface of a current collector with the slurry;
(S30) impregnating the product of (S20) with a second polymer electrolyte; and
(S40) of drying a product obtained from (S30), wherein a product of (S40) is an electrode in which the plurality of electrode active material particles are bound to each other by at least one of the first polymer electrolyte and the second polymer electrolyte to form an integrated structure.

5. The method for manufacturing an electrode for a solid state battery according to claim 4, wherein the slurry includes the first polymer electrolyte and a product of (S20) comprises the electrode active material particles at least partially surface-coated with the first polymer electrolyte.

6. The method for manufacturing an electrode for a solid state battery according to claim 4, wherein step (S20) is carried out by an electrospraying process.

* * * * *